No. 721,105. PATENTED FEB. 17, 1903.
A. J. SPENCER.
STRAW BALER ATTACHMENT FOR THRESHING MACHINES.
APPLICATION FILED AUG. 18, 1902.
NO MODEL.

Witnesses:
James M. Nelson
Russell T. MacFall

Inventor,
Andrew J. Spencer,
By Jos. A. Minturn,
Attorney.

UNITED STATES PATENT OFFICE.

ANDREW J. SPENCER, OF INDIANAPOLIS, INDIANA.

STRAW-BALER ATTACHMENT FOR THRESHING-MACHINES.

SPECIFICATION forming part of Letters Patent No. 721,105, dated February 17, 1903.

Application filed August 18, 1902. Serial No. 120,115. (No model.)

*To all whom it may concern:*

Be it known that I, ANDREW J. SPENCER, a citizen of the United States, residing at Indianapolis, in the county of Marion and State of Indiana, have invented certain new and useful Improvements in Straw-Baler Attachments for Threshing-Machines, of which the following is a specification.

This invention relates to improvements in baling-presses, and is specially intended for use with a threshing-machine to bale the straw as it comes from the machine; but it can be used with advantage for all baling purposes.

The object of the invention is to provide a strong, durable, quick-acting, and easily-operated portable baling-press, to provide a press in which the baling process will be practically continuous, and in which a smoother and more symmetrical bale will be produced with less than the usual amount of power.

Other objects and advantages contemplated by the invention will be fully described, and pointed out in the claims.

I accomplish the objects of the invention by the mechanism illustrated in the accompanying drawings, in which—

Figure 1:
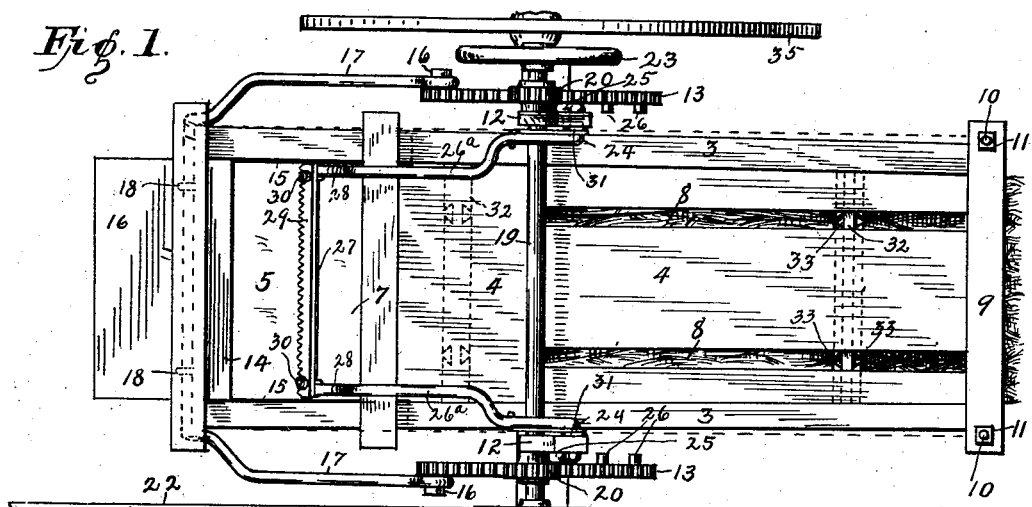
Figure 2:
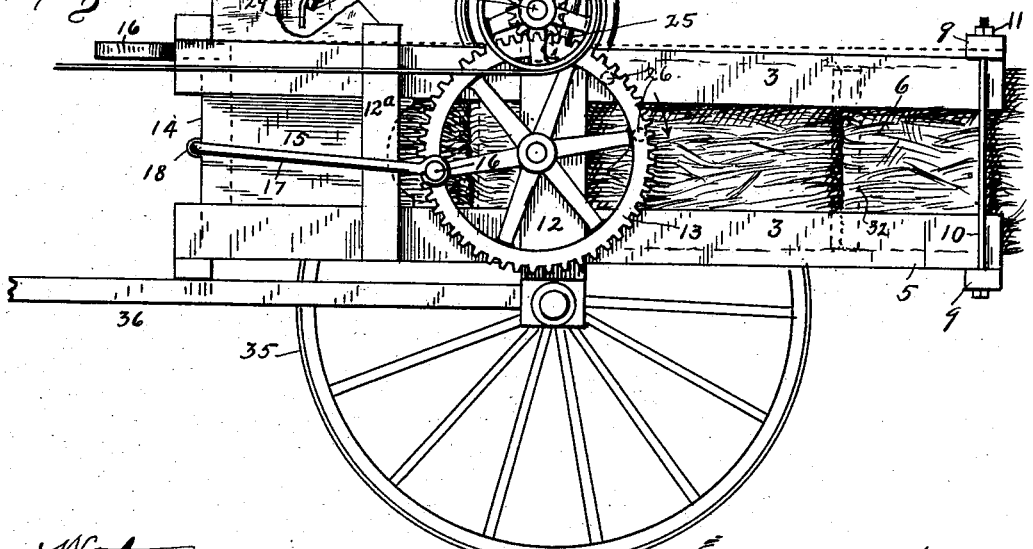

Figure 1 is a top or plan view of my invention; and Fig. 2, a side elevation of same, showing also the discharge end of a separator and connection of separator with the press.

Like characters of reference indicate like parts throughout both views of the drawings.

3 3 are the sides, 4 the top, and 5 the bottom, of my press-body. The sides have central longitudinal openings 6, through which access is afforded to the bales when it is desired to tie them on four sides, as is desirable when short chaffy material is being baled. The top 4 of the press has the opening 7, through which the straw is introduced, and it is also provided with the longitudinal slots 8 8. The bottom 5 is solid, with the exception that it has slots (not shown) like 8 8 of the top, which with said slots 8 8 provide means whereby the wires or twine for tying the bale are easily placed in position on the bale in the press and tied. Over the top 4 and under the bottom 5 are the cross-bars 9 9, the projecting ends of which are joined by the rods 10 10, on the threaded ends of which are nuts 11 11, and by screwing the nuts in or out on the bolts the distance between the top and bottom of the discharge end of the press may be varied in order to regulate the tightness of the bale. This results for the reason that the newly-forming bale is pressed against the finished bale ahead of it, pushing the latter out of the press as the new one is completed, and the size of the outlet with relation to the bale determines the force required to eject the bale from the press, and consequently the amount of compression given to the new bale by the plunger. The outlet from the press is further restricted by drawing in the sides 3 3, as shown by comparison with the parallel dotted lines in Fig. 1.

Secured to the sides 3 are the standards 12 12, which give support to the cog-wheels 13 13. 14 is a plunger which is mounted in the press. It has the side plates 15 15, which work in the opening 6 of the press sides 3 to hold the plunger in vertical position and also to restrain the straw and keep it from projecting through the opening 6 to form ragged bale sides, as would otherwise result. The sides 3 throughout the length of the plunger-stroke are held parallel by standards 12 and $12^a$. The plunger also has the horizontal plate $16^a$, which serves as a platform to hold the straw, which would otherwise drop outside of the plunger when the latter was moved inwardly in the process of compressing the bale. The plunger 14 is connected with wrist-pins 16 on the wheels 13 by the pitmen 17. The pitmen are in practice the ends of a U-shaped bar, the ends of the U having eyelets which receive the wrist-pins and the cross-bar of the U resting against the plunger outside thereof and being secured thereto by staples 18.

The upwardly-projecting ends of the standards are perforated to form bearings for the shaft 19. The shaft 19 has pinions 20 20, meshing with the cog-wheels 13 13. One end of the shaft 19 has the pulley 21, which is connected by belt 22 with any suitable motor, and the opposite end of the shaft has the fly-wheel 23.

The still higher ends of standards 12 are perforated to receive the bar 24. The ends of the bar are bent down to form arms 25, which terminate in the paths of lugs 26, projecting in from the inner sides of wheels 13 13. The bar between the standards is bent forward close to each standard and at right angles to the arms to form the arms 26ª 26ª, and these are bent so their cross-bar 27 will fall between the sides 3 of the press through the opening 7, and said arms 26ª are again bent at right angles to form the parts 28, approximately parallel with the arms 25. To the arms 28 the plate 29, having serrations or fingers along its lower edge, is adjustably secured by bolts 30, having hooks to engage said arms.

By contact of arms 25 with the lugs 26 the finger-bar will be depressed, thereby forcing the straw down through opening 7 into the path of the plunger. The arms are raised by any suitably-arranged springs, such as those shown at 31 of the drawings. It will be noted that I prefer to use three lugs in close relation to each other in order to give three strokes close together with a longer interval between the three.

The bales will be separated from each other by means of the movable partitions 32, which are dropped through opening 7 in front of the plunger, the arms supporting the finger-bar 29 being separated, as shown, to afford convenient access to said opening by an operator walking on top of the press. The partitions have vertical grooves 33, through which the ties are introduced.

34 represents the end of the thresher. My press is mounted on wheels 35 and has the tongue 36, which is coupled to the rear axle of the thresher. The end of the thresher is connected by canvas walls 37 with the mouth of the press, as shown in Fig. 2.

Having thus fully described my invention, what I claim as new, and wish to secure by Letters Patent, is—

1. In a baling-press, a press-body having slotted top, bottom and sides, screw-bolts at the discharge end of said body to adjust the width of the side slots to change the size of the discharge end of the press, a plunger having side plates that work in said side slots at the receiving end of the body and having a table or platform and standards to maintain a uniform width of said side slots for the length of the plunger-stroke.

2. In a baling-press, a press-body having slotted top, bottom and sides, screw-bolts at the discharge end of said body to adjust the width of the side slots to change the size of the discharge end of the press, a plunger having side plates that work in the said side slots at the receiving end of said body, standards to maintain a uniform width of side slots for the length of the plunger-stroke, cog-wheels, pitmen connecting said cog-wheels with the plunger, a shaft above the cog-wheels having pinions meshing therewith and having a fly-wheel and a pulley.

3. In a baling-press, a press-body, a plunger, a pair of crank-wheels connected by pitmen with said plunger said wheels having pins or lugs projecting inwardly from the rims of the wheels, a pusher-frame pivotally secured above the crank-wheels and having arms projecting into the paths of the said lugs whereby the pusher-frame is lowered into the mouth of the press and a serrated plate adjustably secured to the free end of the frame.

4. A press-body having slotted sides and longitudinally-slotted upper and lower walls, a plunger in the body having side wings working in the side slots of the body, cog-wheels, pitmen connecting said cog-wheels with the plunger said cog-wheels having lugs projecting inwardly from their rims, a shaft mounted above the cog-wheels having pinions meshing therewith and also having a driving-pulley and a fly-wheel and a pusher-frame pivotally secured above the shaft, said frame having arms which enter the paths of the lugs on the cog-wheels whereby the frame is lowered by contact of the arms with said lugs, a spring or springs to raise the frame and a finger-bar secured to the free end of the frame.

In witness whereof I have hereunto set my hand and seal, at Indianapolis, Indiana, this 5th day of August, A. D. 1902.

ANDREW J. SPENCER. [L. S.]

Witnesses:
JAMES M. NELSON,
WILLIAM SAFFELL.